United States Patent
Holm et al.

(10) Patent No.: US 11,512,702 B2
(45) Date of Patent: Nov. 29, 2022

(54) METHOD FOR MANUFACTURING A CAN

(71) Applicant: GRUNDFOS HOLDING A/S, Bjerringbro (DK)

(72) Inventors: Allan Hjarbæk Holm, Bjerringbro (DK); Morten Vammen Ørsnæs, Bjerringbro (DK); Lars Østergaard, Bjerringbro (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 40 days.

(21) Appl. No.: 16/925,126

(22) Filed: Jul. 9, 2020

(65) Prior Publication Data

US 2021/0010476 A1 Jan. 14, 2021

(30) Foreign Application Priority Data

Jul. 10, 2019 (EP) ..................................... 19185532

(51) Int. Cl.
*F04D 13/06* (2006.01)
*F04D 29/02* (2006.01)
*F04D 29/08* (2006.01)

(52) U.S. Cl.
CPC ..... *F04D 13/0626* (2013.01); *F04D 13/0633* (2013.01); *F04D 29/026* (2013.01); *F04D 29/086* (2013.01); *F05D 2300/43* (2013.01); *F05D 2300/605* (2013.01)

(58) Field of Classification Search
CPC ............. F04D 13/0626; F04D 13/0633; F04D 13/086; F04D 13/10; F04D 29/026; F04D 13/025; F04D 7/02; F04D 13/06; F04D 13/0606; F04D 1/00; F04D 29/183; F04D 29/605

See application file for complete search history.

(56) References Cited

U.S. PATENT DOCUMENTS

| 3,853,429 | A | * | 12/1974 | Wiedenmann | F04D 29/247 417/356 |
| 5,923,111 | A | * | 7/1999 | Eno | E21B 43/128 310/156.25 |
| 6,140,725 | A | * | 10/2000 | Jensen | F04D 13/062 310/61 |
| 7,513,755 | B2 | * | 4/2009 | Geisinger | F04D 29/183 415/121.2 |
| 7,530,781 | B2 |  | 5/2009 | Fukuchi et al. | |

(Continued)

FOREIGN PATENT DOCUMENTS

| CN | 1696513 A | 11/2005 |
| CN | 102472286 A | 5/2012 |

(Continued)

OTHER PUBLICATIONS

Xiamen LFT Composite Plastic Co., LFT-G® PPS 40 Glass Filled; http://m.lfrt-plastic.com/long-glass-fiber-pps/lft-g-pps-40-glass-filled.html (Year: 2018).*

(Continued)

*Primary Examiner* — Dominick L Plakkoottam
(74) *Attorney, Agent, or Firm* — McGlew and Tuttle, P.C.

(57) ABSTRACT

A submersible pump assembly includes an electric motor (1) and a centrifugal pump, which is driven by the electric motor (1). A rotor (4) formed of plastic or composite material which is manufactured in the extrusion or pultrusion method.

18 Claims, 3 Drawing Sheets

(56) References Cited

U.S. PATENT DOCUMENTS

| | | | | |
|---|---|---|---|---|
| 7,839,036 | B2* | 11/2010 | Hansen | F04D 13/0633 310/87 |
| 8,262,369 | B2* | 9/2012 | Appel | F04D 13/0626 417/365 |
| 8,333,575 | B2* | 12/2012 | Grann | F04D 13/0626 417/423.3 |
| 9,887,603 | B2* | 2/2018 | Damm | F04D 13/0686 |
| 2003/0178903 | A1* | 9/2003 | Rapp | H02K 5/128 310/156.28 |
| 2004/0113504 | A1* | 6/2004 | Agnes | H02K 5/08 310/154.08 |
| 2004/0184936 | A1 | 9/2004 | Yanagihara et al. | |
| 2006/0037743 | A1* | 2/2006 | Head | H02K 5/1285 166/66.4 |
| 2011/0050017 | A1* | 3/2011 | Cunningham | F04D 1/063 310/90.5 |
| 2011/0052432 | A1* | 3/2011 | Cunningham | F16C 32/0489 417/423.3 |
| 2014/0139061 | A1* | 5/2014 | Gutjahr | H02K 9/197 310/86 |
| 2015/0061437 | A1* | 3/2015 | Hudec | H02K 5/128 310/86 |
| 2019/0153997 | A1 | 5/2019 | Voegeli et al. | |

FOREIGN PATENT DOCUMENTS

| | | |
|---|---|---|
| CN | 105659473 A | 6/2016 |
| CN | 106395988 A | 2/2017 |
| CN | 107448394 A | 12/2017 |
| EP | 1231048 A2 | 8/2002 |
| EP | 1768233 A1 | 3/2007 |
| EP | 2610499 A1 | 7/2013 |
| GB | 1330674 A | 9/1973 |
| KR | 100252137 B9 | 4/2000 |
| WO | 2005/072928 A1 | 8/2005 |
| WO | WO2005072928 * | 8/2005 |
| WO | 2014158260 A1 | 10/2014 |

OTHER PUBLICATIONS

Walt Maruszczak, Ticona Engineering Polymers, Advanced composite polymer for the automotive market; http://www.temp.speautomotive.com/SPEA_CD/SPEA2007/pdf/f/newcomposites_part1_paper3_maruszczak_ticona.pdf (Year: 2007).*

Wikipedia, Extrusion, Jun. 26, 2019.

Wikipedia, Pultrusion, Jul. 1, 2019.

Wikipedia, Plastic extrusion, Apr. 26, 2019.

Frunhofer IWU, Pultrusion—Production of Straight and Curved Lightweight Profiles, Fraunhofer Institute for Machine Tools and Forming Technology IWU, 2019.

Sandrine Wiedmer, Zur Pultrusion von thermoplastischen Halbzeugen:Prozessanalyse und Modellbildung, IVW—Schriftenreihe Band 66 Institut fur Verbundwerkstoffe GmbH—Kaiserslautern, 2006, pp. 1-168, Kaiserslautern, Germany, ISSN 1615-021X; ISBN 3-934930-62-X.

K. Friedrich and G. Bechtold, Pultrusion of glass fiber / polypropylene composites, 1999 p. 1 and 687, published by Kluwer Publishers, Dordrecht. ISBN 0 412 80200 7.

* cited by examiner

METHOD FOR MANUFACTURING A CAN

CROSS REFERENCE TO RELATED APPLICATIONS

This application claims the benefit of priority under 35 U.S.C. § 119 of European Application 19 185 532.9, filed Jul. 10, 2019, the entire contents of which are incorporated herein by reference.

TECHNICAL FIELD

The invention relates to a submersible pump assembly with an electric motor with a stator, with a rotor, with a shaft which is connected to the rotor in a rotationally fixed manner and which carries at least one impeller of a single stage or multistage centrifugal pump and with a rotor can between the rotor and the stator.

TECHNICAL BACKGROUND

Cans are applied in motors, with regard to which the rotor space is to be fluid-tight with respect to the stator space. For this reason, particularly with centrifugal pump assemblies, it is counted as belonging to the state of the art to provide a can, be it a can which is open at both sides or in the form of a can pot, between the rotor and the stator, in order to seal the rotor space with respect to the stator space. Such a can, for example from EP 1 768 233 A1, is counted as belonging to the state of the art. It is particularly when the rotor space is filled with fluid or a part of the delivery fluid of the pump flows through it that it is advantageous to manufacture the can from metal, e.g. from stainless steel. The disadvantage with such metallic cans however is the fact that eddy currents which worsen the efficiency of the motor arise. Cans of plastic are more favorable inasmuch as this is concerned, but these need to be provided with an additional hermetically sealing layer, in order to be completely fluid-tight, since otherwise the fluid diffuses from the rotor space into the stator space. This is acceptable with small quantities in the case of pump assemblies which are arranged in a well ventilated environment, so that the low quantities of diffusing fluid can be led away into the environment by way of evaporation. Such cans which consist of plastic are therefore applied with heating circulation pumps, circulation pumps in washing machines and dishwashers and the like, but not with submersible pumps with a hermetically closed casing. Furthermore, cans of plastic are only applied with pump assemblies of a comparatively low power, since limits are placed upon the size of such cans which are typically manufactured in the plastic injection molding method. Since the can should be as thin-walled as possible, with an increasing length it becomes increasingly difficult to fill the injection molding tool with plastic in a complete manner in the available time cycle, which is why it is mostly metallic cans which are applied with centrifugal pump assemblies of a larger construction type.

SUMMARY

Against this background, it is an object of the invention to provide a submersible pump assembly with a can which consists of plastic and which is economically manufacturable. Furthermore, it is also the case of modifying such a can.

According to the invention, this object is achieved by a submersible pump assembly with according to the invention.

The submersible pump assembly according the invention comprises an electric motor with a stator, with a rotor, with a shaft which is connected to the rotor in a rotationally fixed manner and which carries at least one impeller of a single stage or multistage centrifugal pump and with a rotor can between the rotor and the stator. According the invention, the rotor can is manufactured in the extrusion or pultrusion method. This method permits cans which are formed from plastic or composite material to be manufactured in a thin-walled manner and in a quasi arbitrary length. Herein, the manufacture is advantageously effected continuously quasi as an endless tube which is then separated off in the desired length and forms the actual can. Herein, on using a suitable plastic or composite material, the can may be machined further (processed), in particular in the end regions, or formed into a can by way of welding to a transverse wall. The welding-on of a flange at the open end is also possible. An adhesive connection or other suitable non positive or material-fit connection can also be effected instead of a welded connection. The can which is formed in such a manner can also be configured in a reinforced manner, in particular in the regions which are not loaded magnetically, by one or more metallic components, for example for receiving a bearing.

The extrusion of the cans is typically, but not necessarily effected amid the application of an extruder, concerning which the molten material is fed to an annular nozzle under pressure, cools down after its exit and is separated off into a tube section.

If the can is made by pultrusion, fibers are pulled from a creel through a resin and then on through a heated die. The die completes the impregnation of the fibers, controls the resin content and cures the material into its final shape as it passes through the die. This cured profile is then automatically cut to length. Fabrics can also be introduced into the die, in order to provide the fibers with a direction other than 0°. Although pultrusion is a continuous process, producing a profile of constant cross section—a variant known as 'pullforming'—allows for some variation to be introduced into the cross-section. The process pulls the materials through the die for impregnation, and then clamps them in a mold for curing. This makes the process non-continuous, but accommodative of small changes in cross-section.

The can which is manufactured in the extrusion or pultrusion method advantageously consist of a thermoplastic plastic, but basically the present invention is not restricted to this material. The pultrusion method can advantageously be applied with fiber-reinforced materials.

According to an advantageous further development of the invention, the can according to the invention is provided with ribs on its outer side, said ribs extending in the longitudinal direction and in the installed state being provided for integration into longitudinal recesses which are integrated between adjacent stator teeth of the stator of the electrical motor. These ribs which are provided on the outer periphery of the can typically extend parallel to the longitudinal axis of the stator tube, but can however also extend helically around this if the stator is crossed. They significantly increase the intrinsic stability of the can without increasing the thickness of the can which is effective for the magnetic transmission. Furthermore, these ribs have the advantageous characteristic that they close the stator grooves to the inner periphery, said stator grooves being formed between the stator teeth and in which the windings lie.

The can according to the invention advantageously has a size ratio between its length in the axial direction and the wall thickness of more than 150, preferably more than 180. Particularly preferably, the size ratios are >200. Thus, with a wall thickness of the can of 1 mm, can lengths of more than 200 mm result. For example, a wall thicknesses of up to 0.3 mm are currently realistic, given a can length for example of at least 60 mm.

The wall thickness of the can should be as thin as possible and as thick as is necessary, advantageous <1.5 mm. It is to be understood that with regard to the wall thickness, it is the case of the thickness which is formed in the base region of the can, thus next to the possibly present reinforcement ribs.

The can is advantageously formed from liquid crystal polymer (LCP) and/or from a semi-crystalline polymer, e.g. polyphenylene sulphide (PPS), preferably amid the incorporation of filling bodies and/or fibers, which increase the strength.

Such a polymer particularly advantageously comprises 50%, preferably however at least 75% of its maximum global crystallinity, based on the differential scanning calorimetry (DSC) method, as is described in WO 2005/072 928 A1. Such a crystallinity ensures that the diffusion impermeability of the material is significantly increased, so that such a can may also be applied where the stator is encapsulated to the surroundings, as is the case with submersible pumps and underwater pumps.

Inasmuch as it concerns the filling substances and fibers which increase the stability of the can, these on the one hand should be dimensioned such that they can be completely embedded into the plastic even with small wall thicknesses and on the other hand so large that a composite or bond, which accommodates tensile forces and which increases the strength of the can results. In practice, filler particles whose cross-sectional area <500 $\mu m^2$ given a length of <2000 $\mu m$ have proven their worth. In order to be able to apply the can in submersible pumps or other hermetically closed casings or motor casings, the polymer should be designed or selected such that its water permeability is <5e-13 kg/(ms) at 20°, <5e-12 kg/(ms) at 60° and <3e-11 kg/(ms) at 100°. Such a water permeability of the can may also be tolerated in the field of submersible pumps, in particular if an absorption body which binds the fluid which passes despite this high diffusion impermeability is integrated within the motor casing, in particular the stator casing.

A particularly advantage application purpose of the can according to the invention results for pump assemblies in the form of borehole pumps. On account of their elongate shape, of the pump as well as motor, in particular with motors of a greater power uptake, these have a can which is comparatively long in the axial direction and which is predestined to be formed by such a can which has been manufactured according to the invention. Herein, according to an advantageous further development of the invention, the can can project beyond the axial length of the stator of the motor and can form or receive bearing seats in this region which projects beyond the stator.

Sealing means in the form of sealing rings are advantageously provided between the can and the bearing seat. Such sealing rings can be formed by O-rings which lie in grooves of the bearing seat and bear peripherally on the can. Herein, the sealing rings can bear on the inner periphery or on the outer periphery of the can, depending on the arrangement of the bearing seats or of the receivers for the can. In the case of the latter arrangement, one must ensure that the outer periphery of the can is smooth-walled in this region, i.e. the rib structure is interrupted either by way of filling or by way of removal.

In order to support the can within the stator with regard to its design, it is advantageous to provide a support element which is arranged between the can and the stator casing, and specifically in the region which projects beyond the stator. According to an advantageous further development of the invention, this support body is simultaneously configured as an absorption body, in order to receive and bind the fluid which diffuses through the can, even if this is low in quantity. This support body is advantageously configured as a plastic injection molded part and can consist for example of Elantron Epoxi MC 622/W360, MC 634/W342, MC 622/W342 or the like. Such an absorption and support body can be formed from thermoplastic or duroplastic (thermosetting) material.

The invention is hereinafter explained in more detail by way of an embodiment example which is represented in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
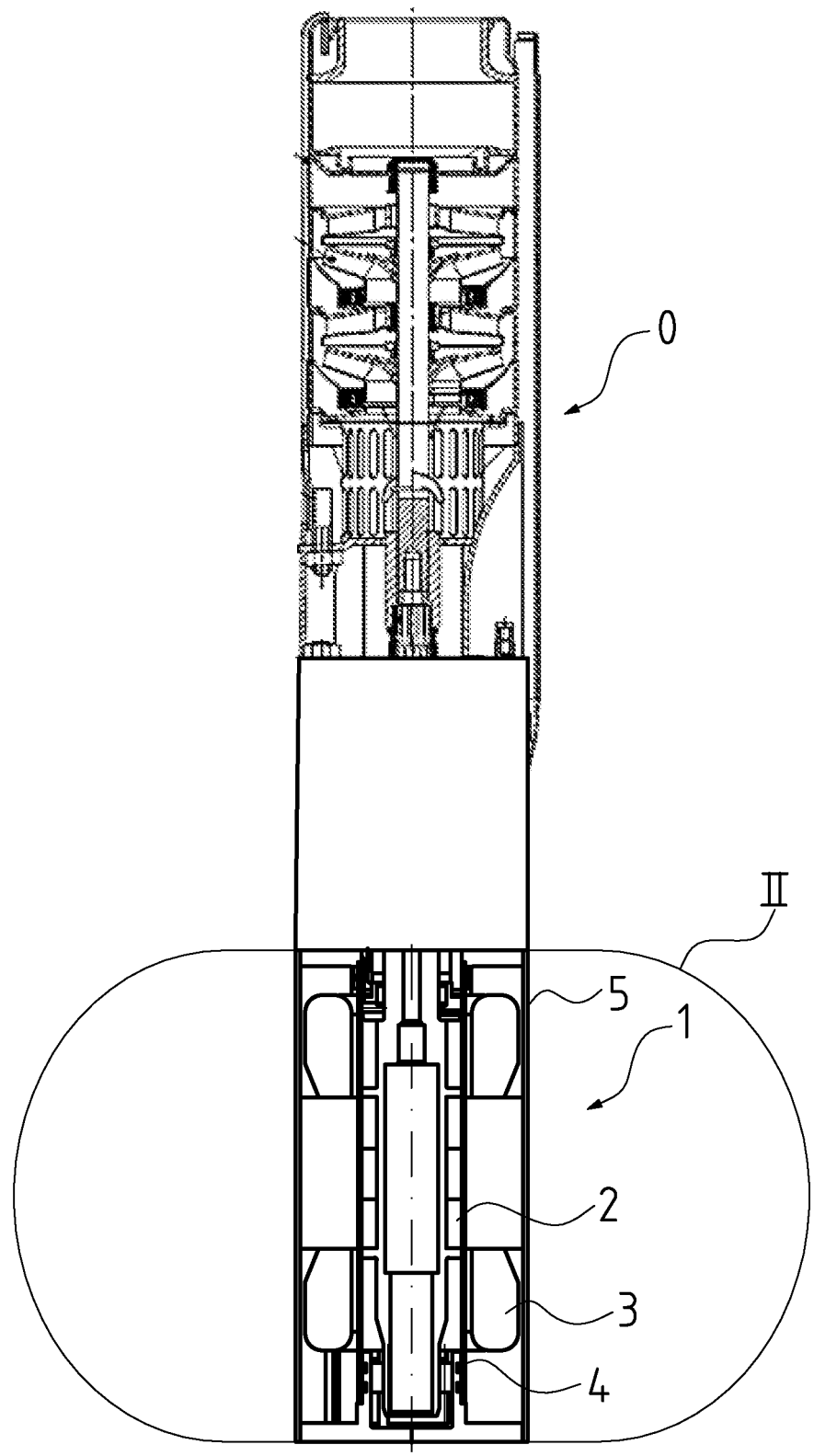
FIG. 1 is a greatly simplified schematic longitudinal sectional view of a borehole pump.

Referring to the drawings, the representation according to FIG. 1 schematically shows a longitudinal section of a borehole pump 0 with a canned motor 1 with a rotor 2 and a stator 3 which are hermetically separated from one another by a can 4. The stator 3 is fixedly arranged within the stator casing 5 which is delimited to the outside by a cylindrical casing jacket 6 and to the inside by the can 4 with the cylindrical inner periphery. The can 4 which is open at both sides is closed at one side by a casing cover 7 which comprises a stepped, cylindrical, inwardly directed projection 8, whose stepped part engages into the free end of the can 4 and is sealed with respect to this via two O-rings 9 which lie in grooves. The projection 8 simultaneously forms a bearing receiver for a radial bearing 10, with which a free end 11 of a shaft forming part of the rotor 2 is rotatably mounted.

The other end of the stator casing 5 is sealed off by an annular cover 13 which at its outer periphery, as with the cover 7, is sealingly and fixedly connected to the casing jacket 6 and likewise comprises an inwardly directed projection 14, whose end encompasses the other free end of the can 4 and there is sealed with respect to the outer side of the can 4 by way of two sealing rings 15. In this region, an annular body 16 is arranged within this projection 14 and within the can 4. The cover 13 simultaneously forms a support body which on the one hand is supported on the casing jacket 6 of the stator 3 and on the other hand supports the shaft-side end of the can 4 to the outside. This body is formed from plastic and is configured as an absorption body, i.e. it is in the position of binding any fluid which diffuses through the can 4, within the stator casing.

The represented canned motor 1 is represented here in its basic construction merely by way of example and it can be a permanent magnet motor, an asynchronous motor or also another motor, but this is not significant for the design construction of the motor, in particular of the can 4. The kinematics can therefore be the other way round, i.e. it can be an outer-runner. The can 4 is an extruded tube, whose ratio between the axial length L and the wall thickness D is 220. It is formed from fiber reinforced, thermoplastic plastic and has the initially specified crystallinity, which here is 77%.

Figure 2:
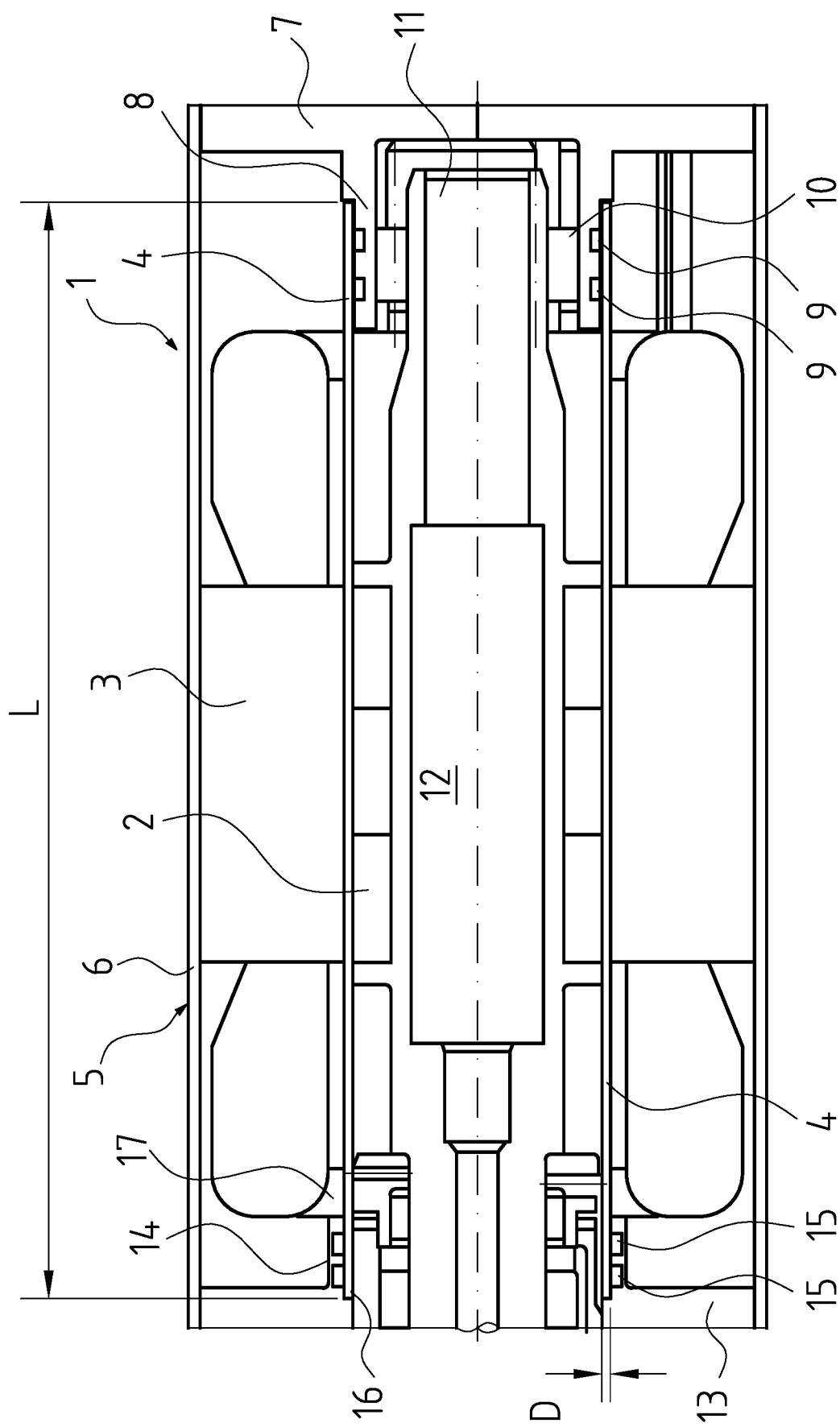
FIG. 2 is a detail view of detail II of FIG. 1 in enlarged presentation.
Figure 3:
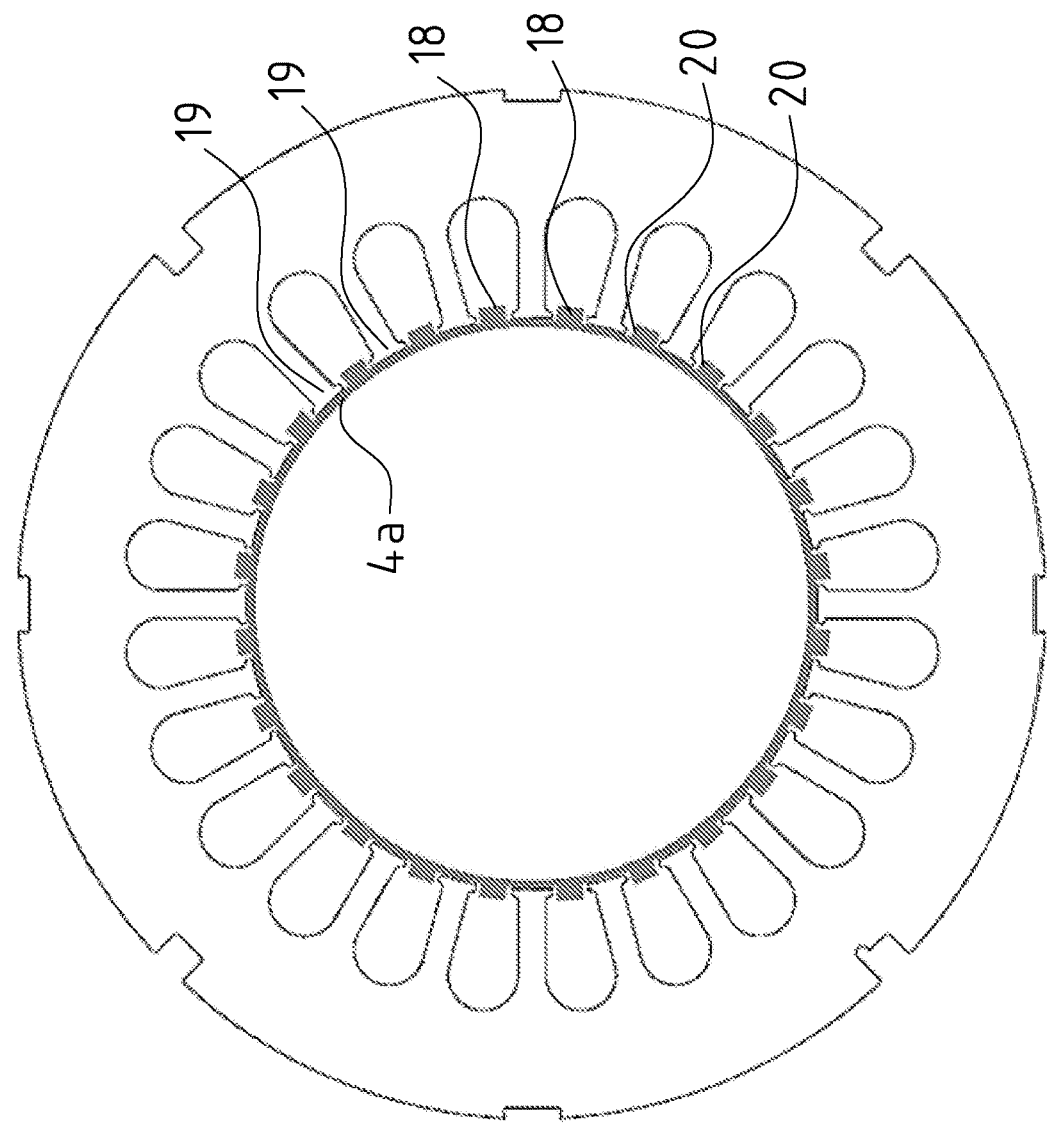
FIG. 3 is a cross sectional view through a stator.

The stator which is represented in cross section by way of FIG. 3, in the representation is restricted to the can and the stator sheet lamination bundle, and the outer casing parts and the windings are not to be seen there. The can 4*a* which is represented there is such which is provided with longitudinal ribs 18 on the outer periphery, said ribs extending in the axial direction on the outer periphery of the can 4*a*. These longitudinal ribs 18 are adapted to the stator shape and specifically in a manner such that in the installed position which is represented in FIG. 3, a longitudinal rib is integrated into the stator groove 20 which is formed between two stator teeth 19, and this rib fills out this grove almost completely and thus closes it off. The longitudinal ribs 18 extend of the complete length of the can 4*a* after its manufacture by way of extrusion. Where, as for example in the motor according to FIG. 2, sealing rings 15 bear at the outer side, the protrusions which are formed by the longitudinal ribs 18 in this region are either removed or the intermediate spaces are filled by a filling material, so that the sealing rings 15 can bear peripherally in a complete manner.

The longitudinal ribs 18 increase the stability of the comparatively thin-walled and elongate can 4, in particular in the installed state, since they assume an intimate and positive bond with the stator lamination bundle due to the integration into the stator grooves 20.

While specific embodiments of the invention have been shown and described in detail to illustrate the application of the principles of the invention, it will be understood that the invention may be embodied otherwise without departing from such principles.

LIST OF REFERENCE CHARACTERS

1 borehole pump
1 canned motor
2 rotor
3 stator
4 can
4*a* can in FIG. 2
5 stator casing
6 casing jacket
7 casing cover
8 projection of 7
9 O-rings
10 radial bearing
11 end of shaft
12 shaft
13 cover
14 projection of 13
15 sealing rings in the form of O-rings
16 annular body
17 thrust bearing
18 longitudinal ribs in FIG. 2
19 stator teeth in FIG. 2
20 stator grooves in FIG. 2
L length of the can
D thickness of the can

What is claimed is:

1. A submersible pump assembly comprising:
an electric motor comprising a stator, a rotor and a shaft connected to the rotor in a rotationally fixed manner;
an impeller of a single-stage or multi-stage centrifugal pump, the shaft carrying the impeller;
a rotor can between the rotor and the stator, wherein the rotor can is formed by one of only material extrusion and only material pultrusion, the rotor can axially projecting beyond the stator of the motor to define a projecting region, the projecting region being sealed with respect to bearing retainers which hold bearings for the shaft;
a stator housing comprising a stator housing inner surface facing in a direction of the rotor can, wherein the rotor can is located radially inward of the stator housing; and
a cover closing one end of the stator housing and one end of the rotor can, the cover comprising a cover portion and a projecting portion integrally connected to the cover portion, the cover portion extending radially beyond the rotor can, the cover portion being in contact with the stator housing inner surface, wherein seals between the rotor can and the bearing retainers are formed by elastic sealing rings, the projecting region comprising the one end of the rotor can, the one end of the rotor can comprising an inner rotor can surface defining at least a portion of an interior rotor can space, at least a portion of the shaft being arranged in the interior rotor can space, the projecting portion being in contact with the inner rotor can surface, at least one of the seals being located between the inner rotor can surface and the projecting portion.

2. A submersible pump assembly according claim 1, wherein the submersible pump assembly is configured as a bore hole pump assembly.

3. A submersible pump assembly according claim 1, wherein the rotor can consists of a thermoplastic material.

4. A submersible pump assembly according to claim 1, wherein the rotor can at a rotor can outer side comprises ribs which run in a rotor can longitudinal direction and which are provided for integration into longitudinal recesses formed between adjacent stator teeth of the stator.

5. A submersible pump assembly according to claim 1, wherein the can has a ratio between can length and wall thickness of greater than 150.

6. A submersible pump assembly according to claim 1, wherein the can has a ratio between can length and wall thickness of greater than 180.

7. A submersible pump assembly according to claim 1, wherein the can has a ratio between can length and wall thickness of greater than 200.

8. A submersible pump assembly according to claim 1, wherein the rotor can has a wall thickness of less than 1.5 mm.

9. A submersible pump assembly according to claim 1, wherein the rotor can comprises a liquid-crystalline polymer (LCP) and/or a semi-crystalline polymer (PPS).

10. A submersible pump assembly according to claim 9, wherein the polymer is enriched with reinforcing fillers.

11. A submersible pump assembly according to claim 9, wherein the polymer comprises at least 50% of a maximum global crystallinity when measured according the Differential Scanning Calorimetry (DSC) procedure.

12. A submersible pump assembly according to claim 9, wherein the polymer comprises at least 75% of a maximum global crystallinity when measured according the Differential Scanning Calorimetry (DSC) procedure.

13. A submersible pump assembly according to claim 10, wherein:
   the rotor can comprises the polymer enriched with the reinforcing fillers; and
   the filler is formed from filler particles with cross-sectional surfaces of less than 500 μm$^2$ and a length of smaller than 2000 μm.

14. A submersible pump assembly according to claim 9, wherein the polymer has a water permeability less than 5e-13 kg/(ms) at 20° C.

15. A submersible pump assembly according to claim 9, wherein the polymer has a water permeability less than 5e-12 kg/(ms) at 60° C.

16. A submersible pump assembly according to claim 9, wherein the polymer has a water permeability less than 5e-11 kg/(ms) at 100° C.

17. A submersible pump assembly according to claim 1, wherein seals between the rotor can and the bearing retainers are formed by elastic sealing O-rings.

18. A submersible pump assembly according to claim 1, wherein:
   the rotor can is supported in a stator housing by at least one supporting element;
   the rotor can is comprised of only plastic; and
   the at least one supporting element is made of a humidity absorbing plastic or composite material.

* * * * *